United States Patent [19]

Leini et al.

[11] Patent Number: 5,797,187
[45] Date of Patent: Aug. 25, 1998

[54] CHAIN SAW GUIDE BAR HAVING DYE-EMITTING NOZZLES

[75] Inventors: Arvo Leini, Edsbyn; Per-Olof Löfgren, Vallsta; Karl-Olof Pettersson, Voxnabruk, all of Sweden

[73] Assignee: Sandvik AB, Sandviken, Sweden

[21] Appl. No.: 677,571

[22] Filed: Jul. 8, 1996

[30] Foreign Application Priority Data

Jul. 6, 1995 [SE] Sweden ................... 9502448

[51] Int. Cl.⁶ .................................................. B27B 17/02
[52] U.S. Cl. ..................... 30/123.4; 30/379.5; 30/387; 83/928; 144/34.1
[58] Field of Search ........................... 30/123.4, 379, 30/379.5, 383, 387; 83/928; 144/34.1, 123

[56] References Cited

U.S. PATENT DOCUMENTS

| | | |
|---|---|---|
| 4,641,432 | 2/1987 | Kume . |
| 4,947,550 | 8/1990 | Wenzel ........................ 30/123.4 |
| 4,981,129 | 1/1991 | Osterman et al. ............ 30/123.4 |
| 5,050,303 | 9/1991 | Sinclair et al. . |
| 5,092,044 | 3/1992 | Edgerton et al. ............. 30/123.4 |
| 5,143,131 | 9/1992 | Seigneur et al. . |
| 5,426,854 | 6/1995 | Leini et al. ................... 30/123.4 |
| 5,564,484 | 10/1996 | Ketonen ...................... 30/123.4 X |

Primary Examiner—Douglas D. Watts
Attorney, Agent, or Firm—Burns, Doane, Swecker & Mathis, L.L.P.

[57] ABSTRACT

A chain saw guide bar is formed of a middle plate and a pair of side plates affixed on opposite sides of the middle plate. One (or both) of the side plates carries nozzles for emitting liquid dyes of different respective colors. Channels for conducting liquid dyes to the respective nozzles are formed by grooves cut in the interface between the middle plate and a side plate. Each channel is surrounded by a laser weld which completely isolates the channels from one another to avoid mixing the colors. The laser welds also secure the middle and side plates together. Additional laser welds secure the middle and side plates together, the additional laser welds being discontinuous.

9 Claims, 2 Drawing Sheets

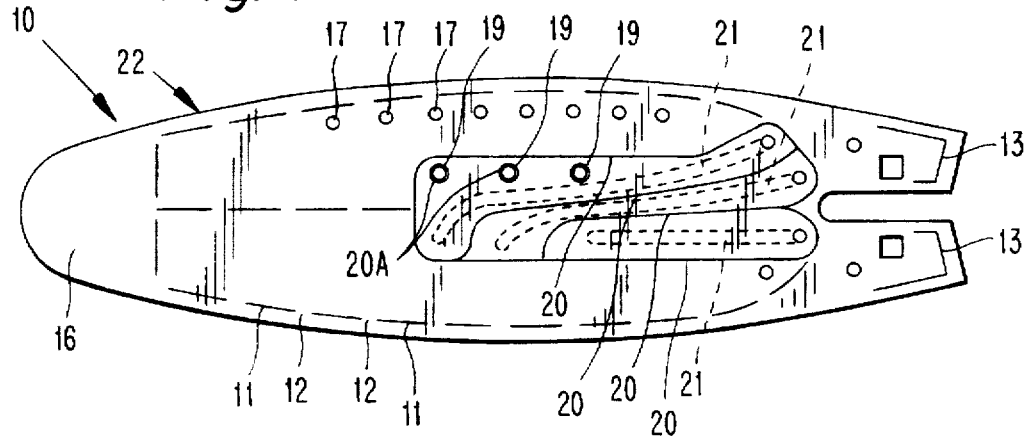
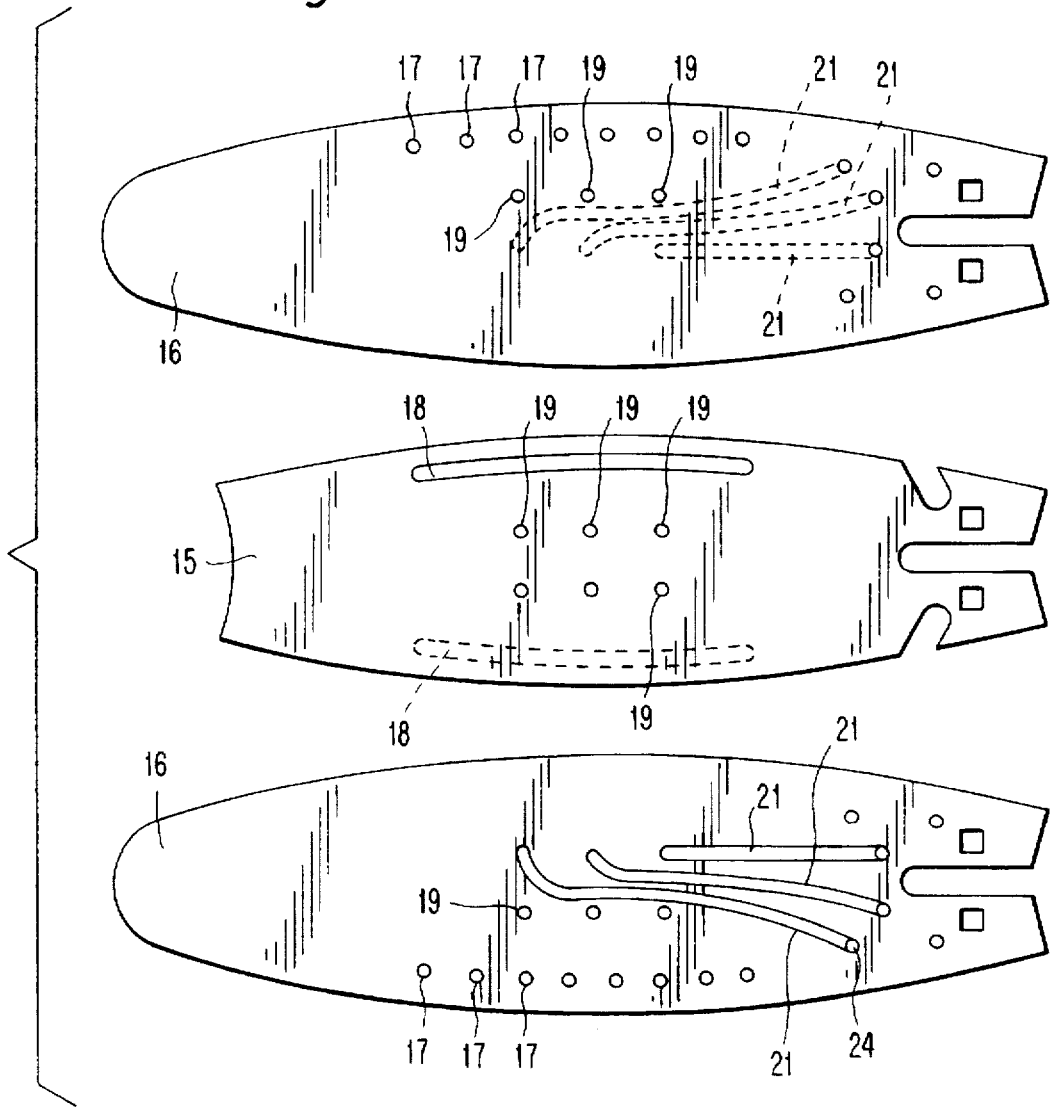

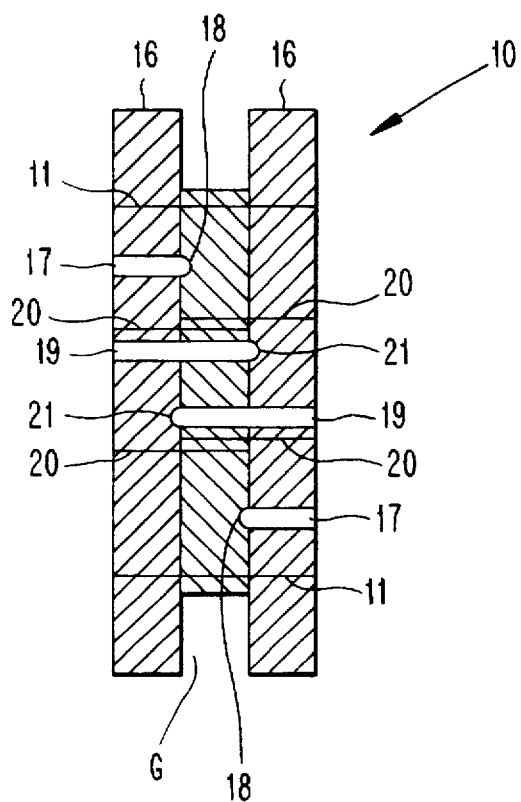

1

CHAIN SAW GUIDE BAR HAVING DYE-EMITTING NOZZLES

BACKGROUND OF THE INVENTION

The present invention relates to saw chain guide bars for vehicle mounted chain saws.

It is previously known to make chain saw guide bars with internal channels for liquids such a lubricant, fungicide or marking dyes, especially in vehicle-mounted guide bars for tree harvesters. In traditional methods for the assembly of guide bars by spot-welding of one middle plate to two side plates, the channels can be formed by grooves disposed in the side plates or in either side of the middle plate, but a common problem has been to keep the liquids from leaking between neighboring channels. One solution of this problem has been to decrease the distance between spot welds, but this restricts the possibility of having crossing channels or independent channel patterns on both sides, as would be required for a reversible guide bar. Another solution is to insert small diameter tubes into the channels during manufacture or later, as disclosed in U.S. Pat. Nos. 5,050,303 or 5,143,131. Such designs require much effort in assembly and maintenance, however.

It is also known from U.S. Pat. No. 4,641,432 to substitute for rows of spot welds a continuous laser weld penetrating and joining the three plates. Although such welds are leak-proof, they restrict the possibility of having independent channel patterns even more than small distance spot welds would, and have the added disadvantage that a crack at any point in the weld can easily spread along the whole weld when the guide bar is bent, since a continuous weld may have large built-in stresses and is more brittle than the plates.

The present invention concerns a guide bar joined by new configurations of laser welds, allowing leak-proof independent channel patterns with more channels, and reducing the risk of spreading cracks.

SUMMARY OF THE INVENTION

The present invention relates to a chain saw guide bar comprising a middle plate and a pair of side plates affixed on opposite sides thereof. Each side plate forms an interface with a respective side of the middle plate. One end of the guide bar defines a clamping end adapted to be clamped to a motor housing. A plurality of nozzles is disposed in at least one side plate for emitting liquid dyes of different respective colors. A plurality of channels lead to the nozzles, the channels defined by respective grooves formed in one of the interfaces. Laser welds are disposed in the interface for securing the middle plate and side plate together. The laser welds are arranged to completely isolate the channels from one another.

Preferably, additional laser welds are disposed in both interfaces for securing the middle plate to the side plates. The additional welds are discontinuous.

BRIEF DESCRIPTION OF THE DRAWING

The objects and advantages of the invention will become apparent from the following detailed description of preferred embodiments thereof in connection with the accompanying drawing in which like numerals designate like elements and in which:

FIG. 1 is a side elevational view of an assembled chain saw guide bar according to the present invention, depicting an external side surface of one side plate;

FIG. 2 is an exploded view of a middle plate and two side plates of a chain saw guide bar prior to assembly thereof (i.e., prior to welding), with an external side surface of one side plate being shown, an internal side surface of the other side plate being shown, and one of the side surfaces of the middle plate being shown; and FIG. 3 is a cross-sectional view through an assembled guide bar.

DETAILED DESCRIPTION OF PREFERRED EMBODIMENTS OF THE INVENTION

A reversible chain saw guide bar (10) according to the invention comprises two identical side plates (16) and one middle plate (15), shown before assembly in FIG. 2. The assembly is made with laser welds as will be explained. The invention can be utilized for guide bars with liquid channels of various numbers and routing. The figures show one preferred embodiment. Along both edges and possibly around the nose of the assembled guide bar there is formed a groove (G) to guide a saw chain.

The laser welds can serve two purposes, i.e., joining the plates with sufficient strength, and blocking leakage of liquid between channels. Welds with the purpose of joining the plates are a laser weld (11, 13) extending along the edge of the guide bar, and a number of laser welds (13) at the clamping end. To get a symmetric weld joining all three plates, a high laser power is used, or laser beams from both sides, whereby the welds (11) extend through all three plates. To avoid high internal stresses and to reduce the risk of spreading cracks, the weld (11) extending along the edge is discontinuous, i.e., it comprises numerous short welds with unwelded interruptions (12). If a crack occurs in one of the short welds (11), the crack will not readily spread to the neighboring short welds, since cracks propagate mainly through brittle material in the heat affected zone of the weld, and since there are no internal stresses in the interruptions. The welds (13) at the clamping end are short enough not to need interruption, but may be provided with interruption, if desired.

Inside of the edge weld (11) there is disposed at least along the top or leading edge (22) a channel (18) for conducting fungicide to a multitude of nozzles (17). The nozzles (17) are formed by welds. The many nozzles ensure that the liquid pressure in this channel is low, so there is no requirement that the edge weld (11) be leak-proof against high pressure. Making the edge weld (11) with interruptions is thus not disadvantageous. Since the guide bar is of the reversible type, nozzles (17) are formed along both the top and bottom edges. Some minor leakage of fungicide into the chain groove (14) might also be tolerated, as the fungicide must anyway be sprayed from the nozzles (17) into the cutting area of the saw chain without harm to the chain.

The channel for fungicide extends between the middle plate and the side plate having the nozzles, and comprises a groove (18) formed in the middle plate. Alternatively, the groove 18 could constitute a cut-out extending completely through the middle plate.

Channels (21) are provided for supplying marking dyes to respective active nozzles (19) that are disposed in one of the side plates (if the chain saw is non-reversible), or in both side plates (if the saw is reversible as depicted). There is one nozzle per channel, the nozzles (19) being formed by welds. The nozzles (19) are for producing color code marks on the timber pieces to indicate tree species, size and quality. Since there is only one nozzle per channel, the pressure in the channels may be high, and it is very important that the dyes from different channels do not mix, so that the codes defined respective colors remain distinguishable from one another.

The thickness of two plates (i.e., a side plate and the middle plate) is used to form each nozzle. Each dye channel is defined by a groove (21) formed in the side plate opposite to the side plate from which the dye is to emerge. Thus, the grooves (21) depicted in broken lines in FIG. 1 are formed in the inside surface of the side plate (16) that is visible in FIG. 1, but they communicate with the nozzles (19) of the other side plate that is not visible in FIG. 1. The non-visible side plate would possess corresponding channels (21) that communicate with the nozzles (19) that are visible in FIG. 1 (see also FIG. 3). To prevent leakage, each of the dye channels is enclosed on all sides by leak-proof laser welds (20). If desired, the nozzles (19) could be encircled by leak-proof laser welds (20A) shown in FIG. 1.

The leak-proof welds (20) should be formed from one side only, i.e., each weld (20) should join the middle plate to only one side plate, to allow independent channel patterns to be formed in the two side plates whereby several narrow channels on each side plate crisscross those on the other side plate (as viewed in a side elevational view). Single-sided welds with shallow penetration will have less internal and bending stresses, and much less heat affected zone.

For clear non-overlapping dye marking, the dye nozzles (19) from different channels are located in a straight row extending parallel to the longitudinal axis of the guide bar. The risk of disturbing the application of the color code by motion of the timber is then minimized.

The drawings depict a reversible saw, so nozzles (19) and channels (21) are provided in both side plates. Alternatively, nozzles (19) could be provided in only one side plate (if the saw were non-reversible), whereby the channels (21) would be formed in the other side plate.

Normally, liquids are sprayed downward onto the stump when felling a tree, and towards the measured and classified cut-off part of the tree when cutting to length, even if the tree is then held horizontally. The liquids are usually supplied to the nozzles from the upper side of the guide bar through supply holes (24) formed in the remote side plate located opposite to the side plate which possesses the nozzles. The supply holes are located at the clamping end of the guide bar if the bar holder is adapted for liquid supply, or from the lower side as the nozzles through a special clamping plate with hose connections, if the holder is not so adapted. The figures show the first mentioned alternative, but it is also possible within the scope of the invention to have supply holes on the same side as the corresponding nozzles. Likewise, the bars can be reversible with nozzles on both sides, or non-reversible with nozzles on one side.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A chain saw guide bar comprising a middle plate and a pair of side plates affixed on opposite sides thereof; each side plate forming an interface with a respective side of the middle plate; one end of the guide bar defining a clamping end adapted to be clamped to a motor housing; a plurality of nozzles disposed in a said side plate for emitting liquid dyes of different respective colors; a plurality of channels defined by respective grooves formed in one of the interfaces, the channels communicating with respective ones of the nozzles; and laser welds disposed in the interface and arranged to completely isolate the channels from one another.

2. The chain saw guide bar according to claim 1, wherein the channels are formed in an interface formed by a side plate situated opposite a side plate in which the nozzles are disposed.

3. The chain saw guide bar according to claim 2, wherein the channels are formed only in the side plate defining the interface.

4. The chain saw guide bar according to claim 1, wherein said laser welds comprise first laser welds, and further including second laser welds surrounding respective nozzles to completely isolate the nozzles from one another.

5. The chain saw guide bar according to claim 1 including additional laser welds for securing the middle plate to both side plates, the additional welds being discontinuous.

6. The chain saw guide bar according to claim 1, wherein the nozzles and channels constitute first nozzles and first channels; and further comprising a second channel formed in one of the interfaces, and a plurality of second nozzles communicating with the second channel; the second nozzles being disposed in one of the side plates and completely isolated from the first nozzles by the laser welds.

7. The chain saw guide bar according to claim 1, wherein the nozzles are arranged in a substantially straight row extending substantially parallel to a longitudinal axis of the guide bar.

8. The chain saw guide bar according to claim 1, wherein the nozzles and channels are disposed in each of the interfaces.

9. The chain saw guide bar according to claim 1, wherein each channel includes a supply hole formed at the clamping end of a side plate.

* * * * *